US012431622B2

(12) United States Patent
Chang et al.

(10) Patent No.: US 12,431,622 B2
(45) Date of Patent: Sep. 30, 2025

(54) MOBILE DEVICE SUPPORTING WIDEBAND OPERATION

(71) Applicant: Acer Incorporated, New Taipei (TW)

(72) Inventors: Kun-Sheng Chang, New Taipei (TW); Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 165 days.

(21) Appl. No.: 18/459,214

(22) Filed: Aug. 31, 2023

(65) Prior Publication Data

US 2025/0015496 A1 Jan. 9, 2025

(30) Foreign Application Priority Data

Jul. 5, 2023 (TW) ................................ 112125046

(51) Int. Cl.
*H01Q 5/307* (2015.01)
*H01Q 1/22* (2006.01)
*H01Q 1/48* (2006.01)

(52) U.S. Cl.
CPC ............... *H01Q 5/307* (2015.01); *H01Q 1/22* (2013.01); *H01Q 1/48* (2013.01)

(58) Field of Classification Search
CPC ............. H01Q 5/307; H01Q 1/22; H01Q 1/48
See application file for complete search history.

(56) References Cited

U.S. PATENT DOCUMENTS 6,707,427 B2 * 3/2004 Konishi ................. H01Q 1/362 343/702
11,444,369 B1 9/2022 Tseng et al.
11,444,385 B2 9/2022 Tai et al.
11,450,959 B2 9/2022 Chang et al.
11,799,204 B2 10/2023 Chang et al.
2022/0094060 A1 * 3/2022 Chang .................... H01Q 5/385

FOREIGN PATENT DOCUMENTS

TW 201807888 A 3/2018
TW 202213859 A 4/2022
TW 202232822 A 8/2022
TW 202243330 A 11/2022
TW 202316731 A 4/2023

OTHER PUBLICATIONS

Chinese language office action dated Jun. 3, 2024, issued in application No. TW 112125046.

* cited by examiner

*Primary Examiner* — Henry Luong
(74) *Attorney, Agent, or Firm* — McClure, Qualey & Rodack, LLP

(57) ABSTRACT

A mobile device supporting wideband operations includes a metal mechanism element, a first radiation element, a second radiation element, a third radiation element, and a dielectric substrate. A slot is formed in the metal mechanism element. The first radiation element has a feeding point. The second radiation element is coupled to a ground voltage. The third radiation element is coupled to the ground voltage. The third radiation element is disposed between the first radiation element and the second radiation element. The dielectric substrate is adjacent to the slot of the metal mechanism element. The first radiation element, the second radiation element, and the third radiation element are disposed on the dielectric substrate. An antenna structure is formed by the slot of the metal mechanism element, the first radiation element, the second radiation element, and the third radiation element.

14 Claims, 7 Drawing Sheets

MOBILE DEVICE SUPPORTING WIDEBAND OPERATION

CROSS REFERENCE TO RELATED APPLICATIONS

This application claims priority of Taiwan Patent Application No. 112125046 filed on Jul. 5, 2023, the entirety of which is incorporated by reference herein.

BACKGROUND OF THE INVENTION

Field of the Invention

The disclosure generally relates to a mobile device, and more particularly, to a mobile device supporting wideband operations.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHZ, and 5.8 GHz.

Antennas are indispensable elements for wireless communication. If an antenna for signal reception and transmission has insufficient operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to a mobile device supporting wideband operations. The mobile device includes a metal mechanism element, a first radiation element, a second radiation element, a third radiation element, and a dielectric substrate. A slot is formed in the metal mechanism element. The first radiation element has a feeding point. The second radiation element is coupled to a ground voltage. The third radiation element is coupled to the ground voltage. The third radiation element is disposed between the first radiation element and the second radiation element. The dielectric substrate is adjacent to the slot of the metal mechanism element. The first radiation element, the second radiation element, and the third radiation element are disposed on the dielectric substrate. An antenna structure is formed by the slot of the metal mechanism element, the first radiation element, the second radiation element, and the third radiation element.

In some embodiments, the slot of the metal mechanism element is a closed slot.

In some embodiments, the first radiation element is substantially positioned at the central point of the slot of the metal mechanism element.

In some embodiments, the first radiation element substantially has a meandering shape.

In some embodiments, the second radiation element substantially has a straight-line shape.

In some embodiments, the third radiation element substantially has an L-shape.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the length of the slot of the metal mechanism element is substantially equal to 0.5 wavelength of the first frequency band, 1 wavelength of the second frequency band, or 1.5 wavelength of the third frequency band.

In some embodiments, the length of the third radiation element is substantially equal to 0.25 wavelength of the third frequency band.

In some embodiments, the mobile device further includes a glass element and a nonconductive base housing. The glass element is attached onto the metal mechanism element. The metal mechanism element and the dielectric substrate are disposed between the glass element and the nonconductive base housing.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
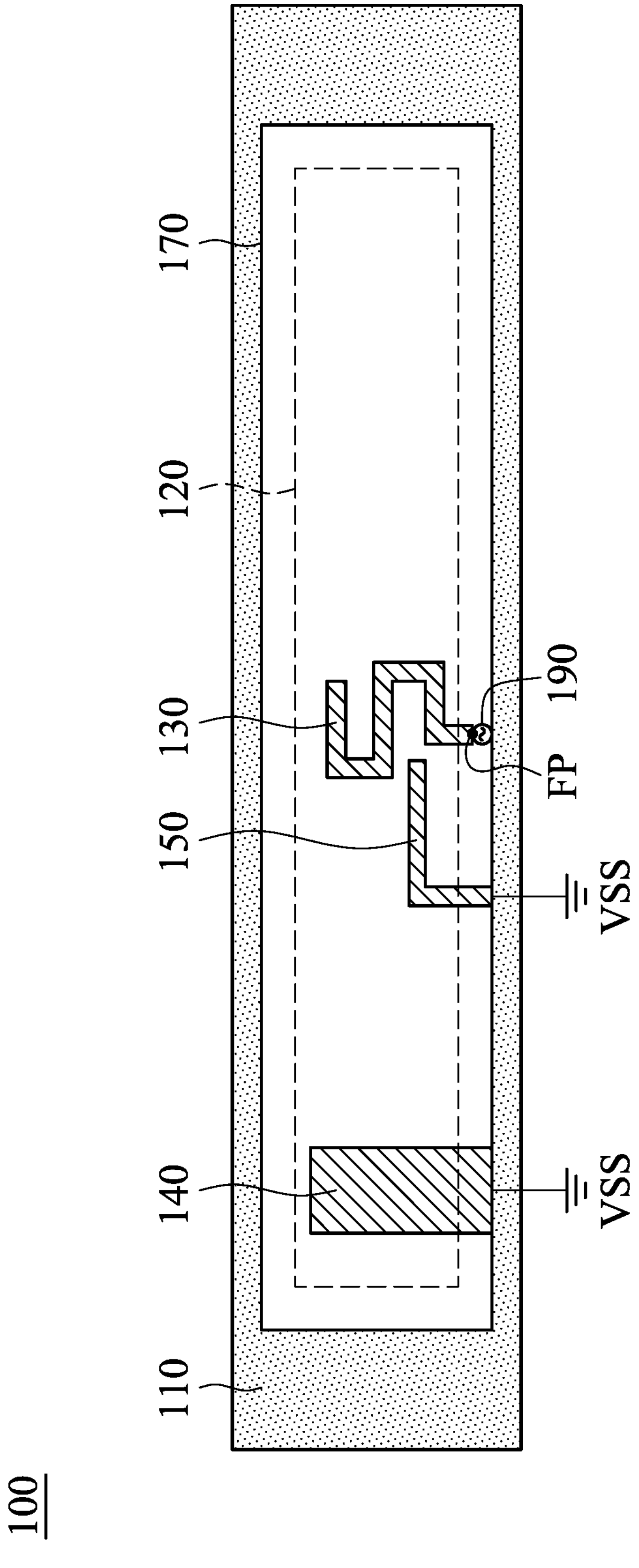
FIG. 1A is a see-through view of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
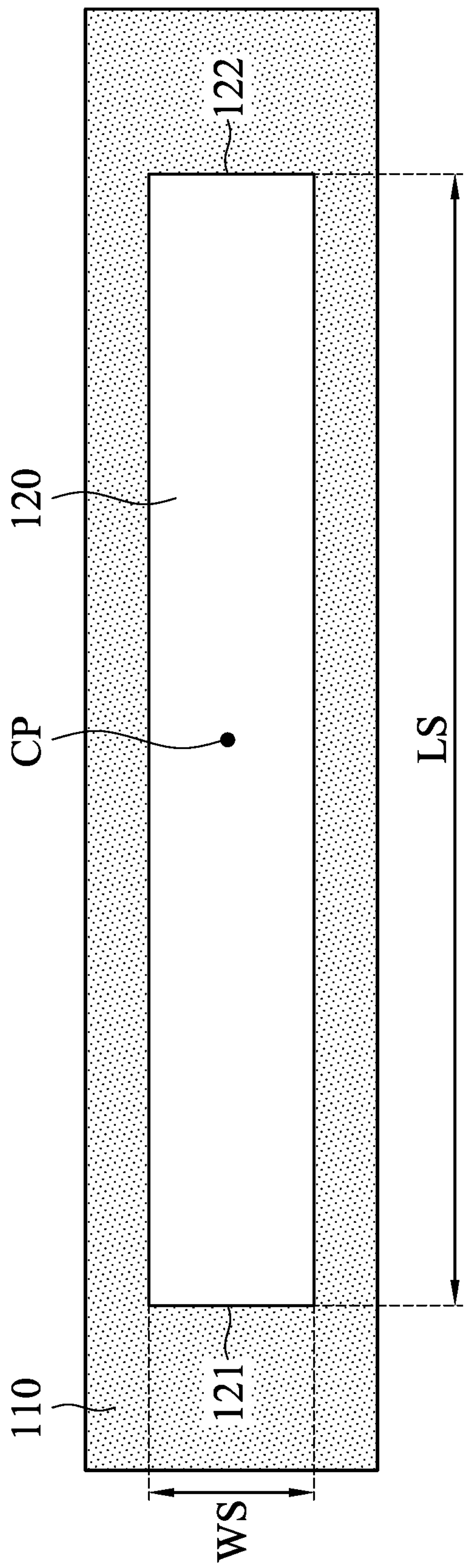
FIG. 1B is a partial view of a lower-layer portion of a mobile device according to an embodiment of the invention.
Figure 1C:
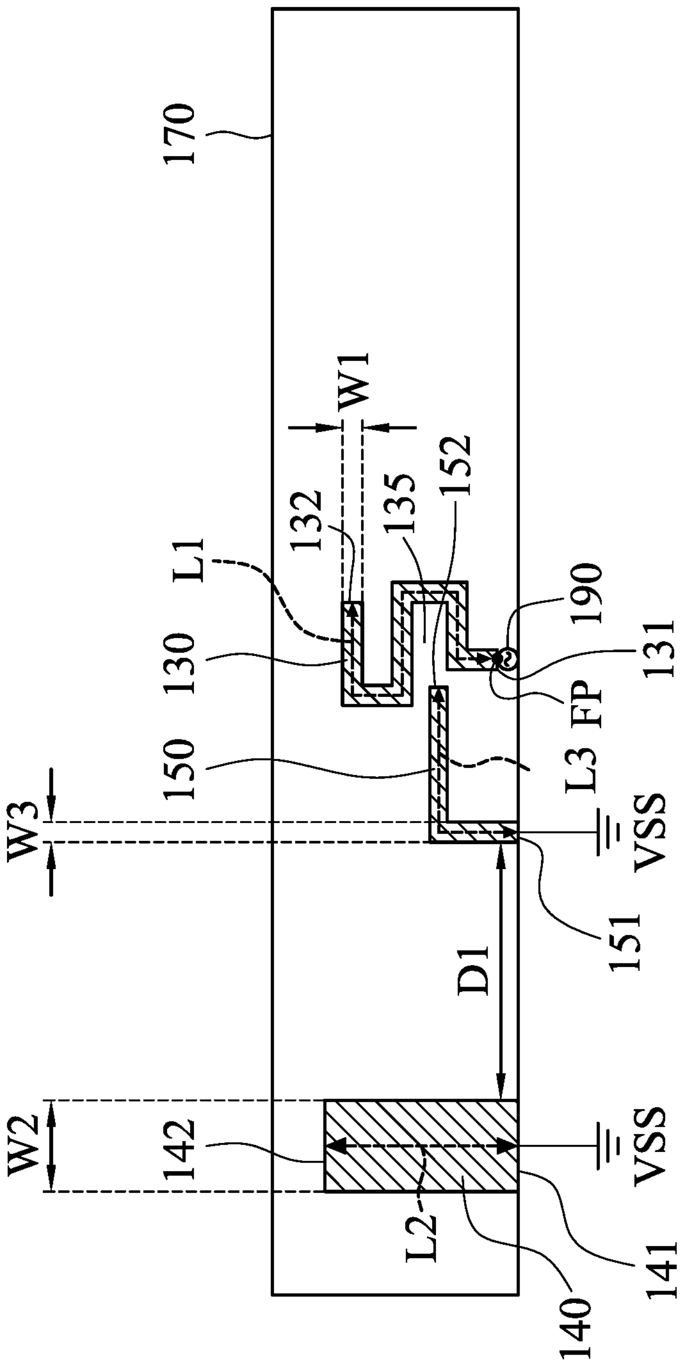
FIG. 1C is another partial view of an upper-layer portion of a mobile device according to an embodiment of the invention.
Figure 1D:
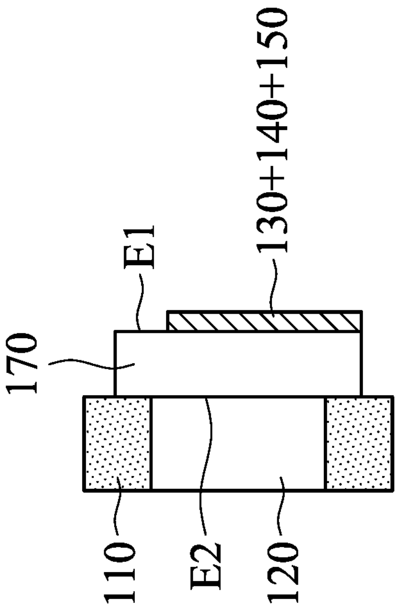
FIG. 1D is a side view of a mobile device according to an embodiment of the invention.

FIG. 1A is a see-through view of a mobile device 100 according to an embodiment of the invention. FIG. 1B is a partial view of a lower-layer portion of the mobile device 100 according to an embodiment of the invention. FIG. 1C is another partial view of an upper-layer portion of the mobile device 100 according to an embodiment of the invention. FIG. 1D is a side view of the mobile device 100 according to an embodiment of the invention. Please refer to FIG. 1A, FIG. 1B, FIG. 1C and FIG. 1D together. For example, the mobile device 100 may be a smartphone, a tablet computer, or a notebook computer. In the embodiment of FIG. 1A, FIG. 1B, FIG. 1C and FIG. 1D, the mobile device 100 includes a metal mechanism element 110, a first radiation element 130, a second radiation element 140, a third radiation element 150, and a dielectric substrate 170. The first radiation element 130, the second radiation element 140, and the third radiation element 150 may all be made of metal materials, such as copper, silver, aluminum, iron, or their alloys.

A slot 120 is formed in the metal mechanism element 110. The slot 120 of the metal mechanism element 110 may substantially have a straight-line shape. Specifically, the slot 120 may be a closed slot with a first closed end 121 and a second closed end 122 which are away from each other. In some embodiments, the mobile device 100 further includes a nonconductive material (not shown) filling the slot 120 of the metal mechanism element 110, so as to achieve the function of waterproof or dustproof.

The dielectric substrate 170 may be an FR4 (Flame Retardant 4) substrate, a PCB (Printed Circuit Board), or a FPC (Flexible Printed Circuit). The dielectric substrate 170 has a first surface E1 and a second surface E2 which are opposite from each other. The first radiation element 130, the second radiation element 140, and the third radiation element 150 may all be disposed on the first surface E1 of the dielectric substrate 170. The second surface E2 of the dielectric substrate 170 may be adjacent to the slot 120 of the metal mechanism element 110. It should be noted that the term "adjacent" or "close" over the disclosure means that the distance (spacing) between two corresponding elements is smaller than a predetermined distance (e.g., 10 mm or shorter), or means that the two corresponding elements directly touch each other (i.e., the aforementioned distance/spacing between them is reduced to 0). In some embodiments, the second surface E2 of the dielectric substrate 170 is directly attached to the metal mechanism element 110, such that the dielectric substrate 170 at least partially covers the slot 120 of the metal mechanism element 110.

The first radiation element 130 may substantially have a meandering shape, which may include an S-shaped portion or a W-shaped portion. Specifically, the first radiation element 130 has a first end 131 and a second end 132. A feeding point FP is positioned at the first end 131 of the first radiation element 130. The second end 132 of the first radiation element 130 is an open end. The feeding point FP may be further coupled to a signal source 190. For example, the signal source 190 may be an RF (Radio Frequency) module. In some embodiments, the first radiation element 130 is substantially positioned at the central point CP of the slot 120 of the metal mechanism element 110. In other words, the first radiation element 130 has a vertical projection on the metal mechanism element 110, and the vertical projection at least partially overlaps the central point CP of the slot 120.

The second radiation element 140 may substantially have a straight-line shape. Specifically, the second radiation element 140 has a first end 141 and a second end 142. The first end 141 of the second radiation element 140 is coupled to a ground voltage VSS. The second end 142 of the second radiation element 140 is an open end, which may at least partially extend across the slot 120 of the metal mechanism element 110. For example, the ground voltage VSS may be provided by a system ground plane (not shown) of the mobile device 100, but it is not limited thereto. In some embodiments, the second radiation element 140 is also adjacent to the first closed end 121 of the slot 120 of the metal mechanism element 110.

The third radiation element 150 may substantially have an L-shape. The third radiation element 150 is disposed between the first radiation element 130 and the second radiation element 140. Specifically, the third radiation element 150 has a first end 151 and a second end 152. The first end 151 of the third radiation element 150 is coupled to the ground voltage VSS. The second end 152 of the third radiation element 150 is an open end. For example, the second end 152 of the third radiation element 150 and the second end 132 of the first radiation element 130 may substantially extend in the same direction. It should be noted that the third radiation element 150 is closer to the first radiation element 130 than the second radiation element 140. In some embodiments, the first radiation element 130 defines a notch region 135, and the second end 152 of the third radiation element 150 at least partially extends into the notch region 135 of the first radiation element 130.

In a preferred embodiment, an antenna structure of the mobile device 100 is formed by the slot 120 of the metal mechanism element 110, the first radiation element 130, the second radiation element 140, and the third radiation element 150.

Figure 2:
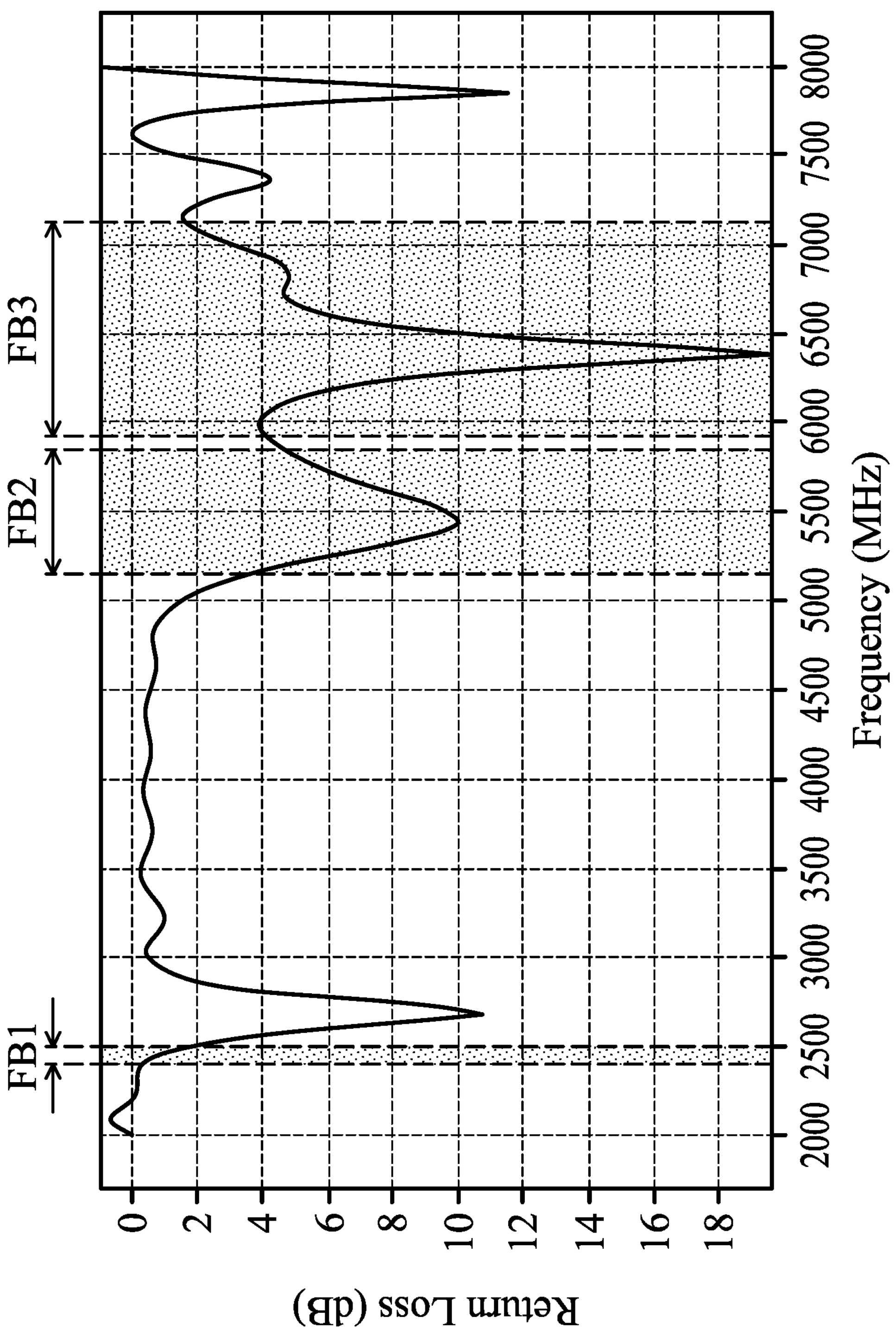
FIG. 2 is a diagram of return loss of an antenna structure of a mobile device according to an embodiment of the invention.

FIG. 2 is a diagram of return loss of the antenna structure of the mobile device 100 according to an embodiment of the invention. The horizontal axis represents the operational frequency (MHz), and the vertical axis represents the return loss (dB). According to the measurement of FIG. 2, the antenna structure of the mobile device 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the mobile device 100 can support at least the wideband operations of the conventional WLAN (Wireless Local Area Network) and the next-generation Wi-Fi 6E.

In some embodiments, the operational principles of the antenna structure of the mobile device 100 will be described as follows. The slot 120 of the metal mechanism element 110 can be excited to generate a fundamental resonant mode, thereby forming the aforementioned first frequency band FB1. The slot 120 of the metal mechanism element 110 can further be excited to generate a first higher-order resonant mode, thereby forming the aforementioned second frequency band FB2. Also, the slot 120 of the metal mechanism element 110 can further be excited to generate a second higher-order resonant mode, thereby forming the aforementioned third frequency band FB3. According to practical measurements, if the first radiation element 130 is disposed at the central point CP of the slot 120 of the metal mechanism element 110, the operational bandwidths of the first frequency band FB1, the second frequency band FB2, and the third frequency band FB3 as mentioned above can be further increased. In addition, if the second end 152 of the third radiation element 150 at least partially extends into the notch region 135 of the first radiation element 130, a coupling amount between the first radiation element 130 and the third radiation element 150 can be enhanced, such that the impedance matching of the aforementioned third frequency band FB3 can be improved.

In some embodiments, the element sizes of the mobile device 100 will be described as follows. The length LS of the slot 120 of the metal mechanism element 110 may be substantially equal to 0.5 wavelength (λ/2) of the first frequency band FB1 of the antenna structure of the mobile device 100. Alternatively, the length LS of the slot 120 of the metal mechanism element 110 may be substantially equal to 1 wavelength (1λ) of the second frequency band FB2 of the antenna structure of the mobile device 100. Alternatively, the length LS of the slot 120 of the metal mechanism element 110 may be substantially equal to 1.5 wavelength (3λ/2) of the third frequency band FB3 of the antenna structure of the mobile device 100. The width WS of the slot 120 of the metal mechanism element 110 may be from 3 mm to 5 mm. The length L1 of the first radiation element 130 may be from 5 mm to 10 mm. The width W1 of the first radiation element 130 may be from 0.5 mm to 1 mm. The length L2 of the second radiation element 140 may be from 3 mm to 5 mm. The width W2 of the second radiation element 140 may be from 2 mm to 3 mm. The length L3 of the third radiation element 150 may be substantially equal to 0.25 wavelength (λ4) of the third frequency band FB3 of the antenna structure of the mobile device 100. The width W3 of the third radiation element 150 may be from 0.5 mm to 1 mm. The distance D1 between the second radiation element 140 and the third radiation element 150 may be from 8 mm to 12 mm. The above ranges of element sizes are calculated and obtained according to many experiment results, and they help to optimize the operational bandwidth and impedance matching of the antenna structure of the mobile device 100.

The following embodiments will introduce different configurations and detail structural features of the mobile device 100. It should be understood that these figures and descriptions are merely exemplary, rather than limitations of the invention.

Figure 3:
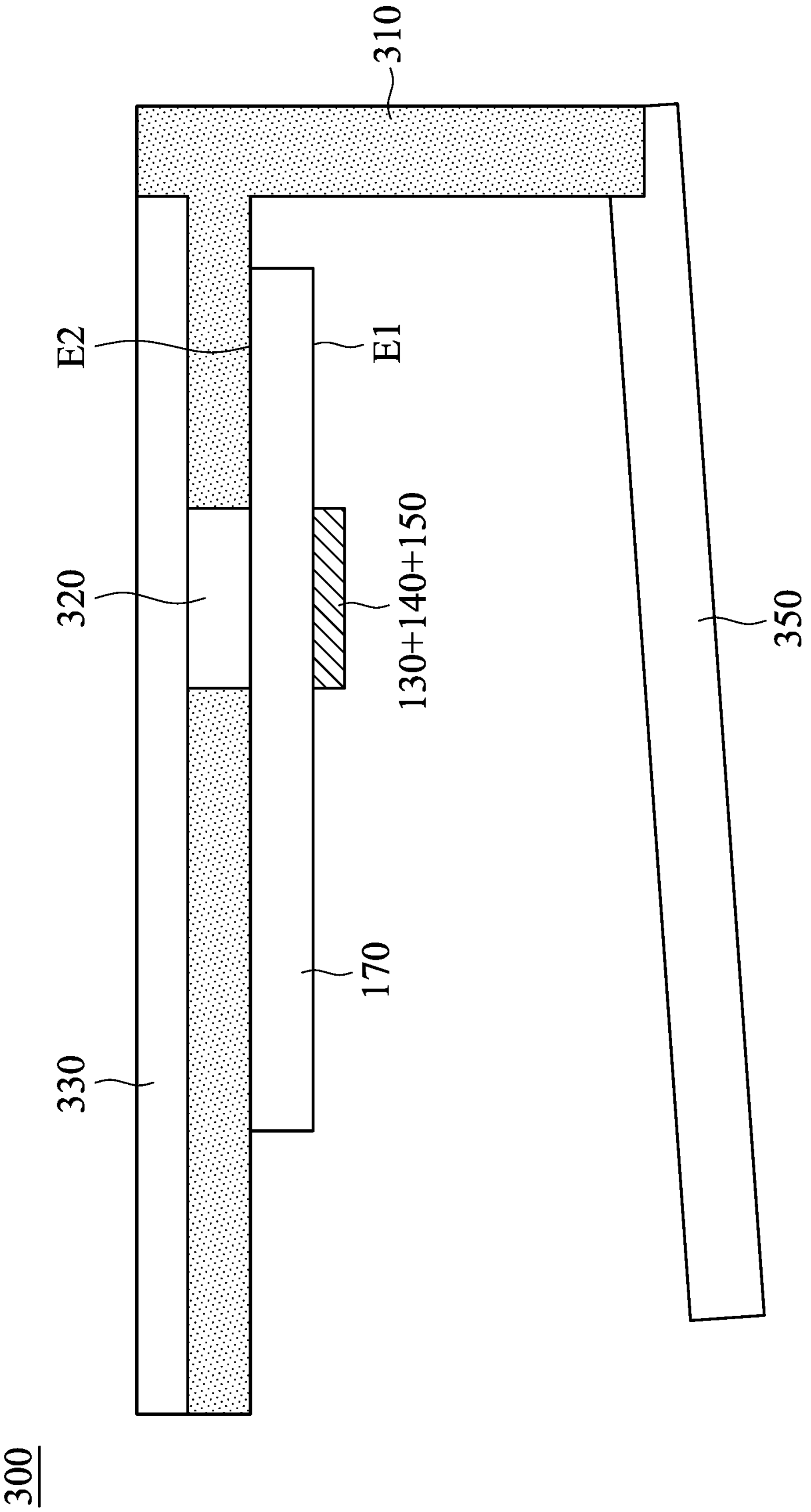
FIG. 3 is a sectional view of a mobile device according to another embodiment of the invention.

FIG. 3 is a sectional view of a mobile device 300 according to another embodiment of the invention. FIG. 3 is similar to FIG. 1A, FIG. 1B, FIG. 1C and FIG. 1D. In the embodiment of FIG. 3, the mobile device 300 further includes a glass element 330 and a nonconductive base housing 350. For example, the nonconductive base housing 350 may have a retraction cutting design, which may be disposed opposite to the glass element 330. In addition, a metal mechanism element 310 of the mobile device 300 may substantially have a bending shape, and a slot 320 may be formed in the metal mechanism element 310. The glass element 330 may be a glass board. Specifically, the glass element 330 may be attached onto a surface of the metal mechanism element 310, and the second surface E2 of the dielectric substrate 170 may be attached onto the opposite surface of the metal mechanism element 310. That is, the slot 320 of the metal mechanism element 310 may be covered by the glass element 330. In some embodiments, the metal mechanism element 310, the dielectric substrate 170, the first radiation element 130, the second radiation element 140, and the third radiation element 150 thereon are all disposed between the glass element 330 and the nonconductive base housing 350. It should be understood that the combination of the metal mechanism element 310 and the glass element 330 is considered as the so-called "C-component" in the field of notebook computers, and the nonconductive base housing 350 is considered as the so-called "D-component" in the field of notebook computers. Other features of the mobile device 300 of FIG. 3 are similar to those of the mobile device 100 of FIG. 1A, FIG. 1B, FIG. 1C and FIG. 1D. Accordingly, the two embodiments can achieve similar levels of performance.

Figure 4:
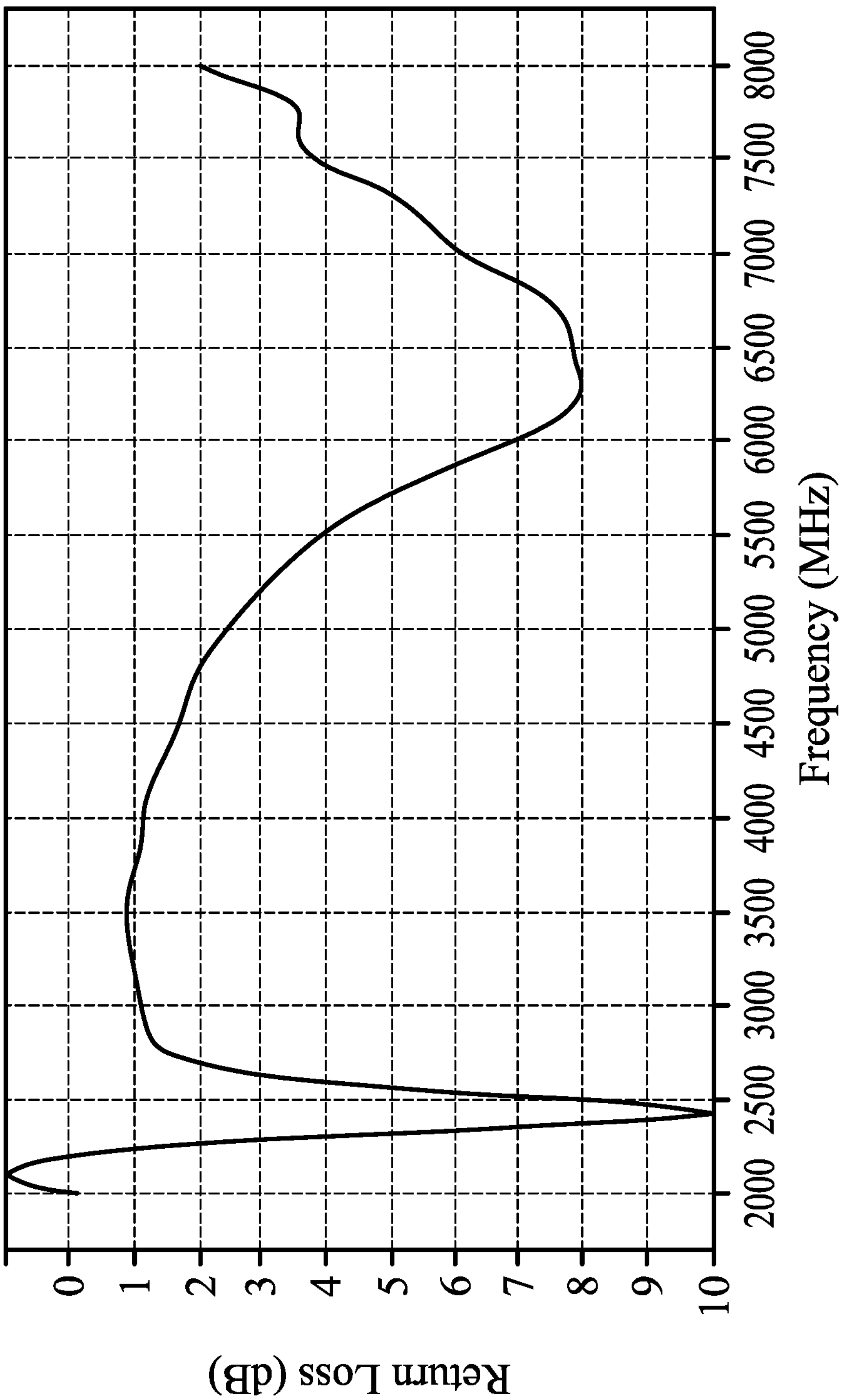
FIG. 4 is a diagram of return loss of an antenna structure of a mobile device without using a proposed design according to another embodiment of the invention.

FIG. 4 is a diagram of return loss of the antenna structure of the mobile device 300 without using the proposed design according to another embodiment of the invention. Since the glass element 330 has a relatively large effective dielectric constant (e.g., from 7 to 8), it may negatively affect the radiation pattern of the antenna structure of the mobile device 300 so much. According to the measurement of FIG. 4, if the proposed design of the invention is not applied, the operational bandwidth of the antenna structure of the mobile device 300 will be very limited.

Conversely, if the proposed design of the invention is applied, the diagram of return loss of the antenna structure of the mobile device 300 can be similar to the measurement of FIG. 2. It will not be interfered with by the glass element 330. In other words, the proposed antenna structure of the invention can be used in different environments, and it not only improves the device appearance but also enhances the whole communication quality.

The invention proposes a novel mobile device with a novel antenna structure. In comparison to the conventional design, the invention has several advantages, including its small size, wide bandwidth, low manufacturing cost, and improved device appearance. Therefore, the invention is suitable for application in a variety of communication devices.

Note that the above element sizes, element shapes, and frequency ranges are not limitations of the invention. An antenna designer can fine-tune these settings or values according to different requirements. It should be understood that the mobile device of the invention is not limited to the configurations of FIGS. 1-4. The invention may merely include any one or more features of any one or more embodiments of FIGS. 1-4. In other words, not all of the features displayed in the figures should be implemented in the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device supporting wideband operations, comprising:

a metal mechanism element, wherein a slot is formed in the metal mechanism element;

a first radiation element, having a feeding point;

a second radiation element, coupled to a ground voltage;

a third radiation element, coupled to the ground voltage, wherein the third radiation element is disposed between the first radiation element and the second radiation element; and a dielectric substrate, disposed adjacent to the slot of the metal mechanism element, wherein the first radiation element, the second radiation element, and the third radiation element are disposed on the dielectric substrate;

wherein an antenna structure is formed by the slot of the metal mechanism element, the first radiation element, the second radiation element, and the third radiation element;

wherein the mobile device further comprises:

a glass element, attached onto the metal mechanism element; and a nonconductive base housing, wherein the metal mechanism element and the dielectric substrate are disposed between the glass element and the nonconductive base housing.

2. The mobile device as claimed in claim 1, wherein the slot of the metal mechanism element is a closed slot.

3. The mobile device as claimed in claim 1, wherein the first radiation element is substantially positioned at a central point of the slot of the metal mechanism element.

4. The mobile device as claimed in claim 1, wherein the first radiation element substantially has a meandering shape.

5. The mobile device as claimed in claim 1, wherein the second radiation element substantially has a straight-line shape.

6. The mobile device as claimed in claim 1, wherein the third radiation element substantially has an L-shape.

7. The mobile device as claimed in claim 1, wherein the antenna structure covers a first frequency band, a second frequency band, and a third frequency band.

8. The mobile device as claimed in claim 7, wherein the first frequency band is from 2400 MHz to 2500 MHz.

9. The mobile device as claimed in claim 7, wherein the second frequency band is from 5150 MHz to 5850 MHz.

10. The mobile device as claimed in claim 7, wherein the third frequency band is from 5925 MHz to 7125 MHz.

11. The mobile device as claimed in claim 7, wherein a length of the slot of the metal mechanism element is substantially equal to 0.5 wavelength of the first frequency band.

12. The mobile device as claimed in claim 7, wherein a length of the slot of the metal mechanism element is substantially equal to 1 wavelength of the second frequency band.

13. The mobile device as claimed in claim 7, wherein a length of the slot of the metal mechanism element is substantially equal to 1.5 wavelength of the third frequency band.

14. The mobile device as claimed in claim 7, wherein a length of the third radiation element is substantially equal to 0.25 wavelength of the third frequency band.

* * * * *